(12) United States Patent
Xing

(10) Patent No.: US 11,812,084 B2
(45) Date of Patent: Nov. 7, 2023

(54) METHOD AND DEVICE FOR CONTENT RECORDING AND STREAMING

(71) Applicant: NORTHWEST INSTRUMENT INC., Dover, NJ (US)

(72) Inventor: David Xing, Dover, NJ (US)

(73) Assignee: NORTHWEST INSTRUMENT INC., Dover, NJ (US)

( * ) Notice: Subject to any disclaimer, the term of this patent is extended or adjusted under 35 U.S.C. 154(b) by 0 days.

(21) Appl. No.: 17/867,144

(22) Filed: Jul. 18, 2022

(65) Prior Publication Data

US 2022/0353563 A1   Nov. 3, 2022

Related U.S. Application Data

(63) Continuation-in-part of application No. 16/998,579, filed on Aug. 20, 2020, now Pat. No. 11,395,049.

(Continued)

(51) Int. Cl.
*H04N 21/2668* (2011.01)
*H04N 21/81* (2011.01)
(Continued)

(52) U.S. Cl.
CPC ... *H04N 21/2668* (2013.01); *H04N 21/25875* (2013.01); *H04N 21/472* (2013.01); *H04N 21/47815* (2013.01); *H04N 21/8126* (2013.01)

(58) Field of Classification Search
CPC ........ H04N 21/2668; H04N 21/25875; H04N 21/472; H04N 21/47815; H04N 21/8126
See application file for complete search history.

(56) References Cited

U.S. PATENT DOCUMENTS

2010/0142915 A1*   6/2010   McDermott ....... H04N 21/4722
                                                386/343
2011/0164163 A1    7/2011   Bilbrey et al.
(Continued)

FOREIGN PATENT DOCUMENTS

GB         2505978 A       3/2014

OTHER PUBLICATIONS

European Patent Office European Search Report for Application No. 20213548.9 dated Oct. 1, 2021 8 pages.

*Primary Examiner* — Kyu Chae
(74) *Attorney, Agent, or Firm* — ANOVA LAW GROUP, PLLC

(57) ABSTRACT

A content sharing method applied to a computing device includes: obtaining real-time image information of a target content for a content sharing event, obtaining user information of a plurality of user devices participating the content sharing event, presenting a virtual content sharing scene that includes the image information of the target content and the interaction information, obtaining authorized supplemental content corresponding to a target user type of the target user device, and presenting at least part of the authorized supplemental content in the content sharing scene. The user information of the plurality of user devices includes a plurality of user types of the plurality of user devices and/or interaction information of the plurality of user devices. The authorized supplemental content corresponding to a first user type is different from the authorized supplemental content corresponding to a second user type different from the first user type.

18 Claims, 5 Drawing Sheets

Related U.S. Application Data

(60) Provisional application No. 63/002,604, filed on Mar. 31, 2020.

(51) Int. Cl.
    *H04N 21/478*     (2011.01)
    *H04N 21/472*     (2011.01)
    *H04N 21/258*     (2011.01)

(56) References Cited

U.S. PATENT DOCUMENTS

| | | | |
|---|---|---|---|
| 2014/0019882 A1* | 1/2014 | Chew | G06Q 10/10 |
| | | | 715/753 |
| 2014/0344661 A1 | 11/2014 | Sipe et al. | |
| 2015/0149929 A1* | 5/2015 | Shepherd | H04L 65/403 |
| | | | 715/753 |
| 2017/0034237 A1 | 2/2017 | Silver | |
| 2017/0336441 A1 | 11/2017 | Hosein et al. | |
| 2017/0366557 A1 | 12/2017 | Schaer et al. | |
| 2018/0374267 A1 | 12/2018 | Yurkin | |
| 2018/0374268 A1 | 12/2018 | Niles | |
| 2019/0082196 A1 | 3/2019 | Kedenburg, III | |
| 2019/0104235 A1 | 4/2019 | Sarkar | |
| 2020/0051338 A1* | 2/2020 | Zia | G06F 9/451 |
| 2020/0211251 A1* | 7/2020 | Noris | G06F 3/011 |
| 2020/0267349 A1 | 8/2020 | Garrido et al. | |
| 2020/0401710 A1* | 12/2020 | Wei | G06F 3/14 |

\* cited by examiner

METHOD AND DEVICE FOR CONTENT RECORDING AND STREAMING

CROSS-REFERENCES TO RELATED APPLICATIONS

This application is a continuation-in-part of U.S. patent application Ser. No. 16/998,579, filed on Aug. 20, 2020, which claims the benefit of priority of U.S. Provisional Patent Application No. 63/002,604, titled "Method and Device for Content Recording and Streaming," filed on Mar. 31, 2020, the entire contents of both of which are incorporated herein by reference.

TECHNICAL FIELD

The present disclosure generally relates to audio and video processing technology and augmented reality (AR) technology, and in particular, to systems, methods, and devices for recording and streaming content.

BACKGROUND

Video and audio recording and streaming of live scenes are becoming a key attraction for users of computing devices. For instance, more and more users are enjoying the benefits of creating videos at live events, such as sports events and live performances, and sharing the recorded video with an audience either in real time or after the event.

Currently, a participant or an event personnel may use a mobile device, such as a smart phone or a tablet, or a digital video (DV) recorder to record live videos. However, these devices in general only record real scenes in the physical environment. Due to development of wireless technology, live event organizers may deliver additional contents to the on-site audiences, such as real-time prompt information or interactive information between performers and audiences. In particular, the development of augmented reality (AR) technology may allow stage performers to add real-time special effects or interactive information in a digital format. When the on-site audiences want to record live scenes for sharing, they may either record real-scene videos of the live event, or they may record video frames capturing all the information, including the additional contents, blended together in the video frames. They cannot selectively remove certain contents that they do not wish to display during sharing or stored playback. This limitation may negatively affect user experience of such a recording system. In addition, for the event organizers, they may not wish to share certain information to outside viewers who are not a participant or attendee of the event. For example, they may wish to exclude certain on-site prompt or interactive information from videos shared to public audiences. The current recording systems do not provide selective recording of real-scenes and supplemental contents, and do not allow streaming systems to selectively broadcast or display the recorded contents. The present disclosure in part aims to address the limitations in the existing systems.

SUMMARY

In one aspect, the present disclosure provides a content sharing method. The method may be applied to a target user device, and includes: obtaining real-time image information of a target content for a content sharing event; obtaining user information of a plurality of user devices participating the content sharing event, the plurality of user devices including the target user device, the user information of the plurality of user devices including a plurality of user types of the plurality of user devices and/or interaction information of the plurality of user devices, and the plurality of user types including a first user type and a second user type different from the first user type; presenting a virtual content sharing scene that includes the image information of the target content and the interaction information; obtaining authorized supplemental content corresponding to a target user type of the target user device, the target user type being one of the first user type and the second user type, the first user type corresponding to a first selection rule, the second user type corresponding to a second selection rule different from the first selection rule, and the authorized supplemental content corresponding to the first user type being different from the authorized supplemental content corresponding to the second user type; and presenting at least part of the authorized supplemental content in the content sharing scene.

In certain embodiments, the method further includes determining the target user type according to at least one of location verification or user identity verification.

In certain embodiments, the user identity verification includes user biometric information verification.

In certain embodiments, the method further includes presenting a supplemental content selection interface for the target user device; obtaining selected supplemental content from the authorized supplemental content according to a user operation performed on the supplemental content selection interface; and presenting the selected supplemental content in the content sharing scene.

In certain embodiments, the method further includes sending an access request for obtaining additional information about the target content, the access request including the target user type of the target user device; receiving a requirement associated with the access request; sending an acceptance response indicating that the target user fulfills the requirement; and after sending the acceptance response, receiving the additional information about the target content.

In certain embodiments, the target user type is the first user type, the method further includes, receiving an access request for obtaining additional information about the target content from one user device of the plurality of user devices, the one user device having the second user type; sending a requirement associated with the access request; receiving an acceptance response indicating that the one user device fulfills the requirement; and sending the additional information about the target content to the one user device.

In certain embodiments, the first user type is a client type and the second user type is a vendor type, the target user type of the target user device is the client type, and the method further includes: presenting a vendor supplemental content selection interface; obtaining a vendor-specific selection rule corresponding to the vendor type according to a user operation on the vendor supplemental content selection interface; and sending the vendor-specific selection rule to one of the plurality of user devices with the vendor type, for the one of the plurality of user devices with the vendor type to obtain and present selected supplemental content in the content sharing scene according to the vendor-specific selection rule.

In certain embodiments, the first user type is a client type and the second user type is a vendor type, the target user type of the target user device is the vendor type, and the method further includes: receiving a vendor-specific selection rule from one of the plurality of user devices with the client type; obtaining selected supplemental content according to the vendor-specific selection rule; and presenting the selected supplemental content in the content sharing scene.

In certain embodiments, the authorized supplemental content includes at least one of a map, a blueprint, ranging information, dimension information, location information, a quote, or purchase information.

In certain embodiments, the method further includes obtaining product information including at least a graphic representation of a product and attribute information of the product; and presenting the product information.

In certain embodiments, presenting the product information includes presenting the product information in the content sharing scene.

In certain embodiments, presenting the product information includes presenting, using an augmented reality device, the product information according to a physical scene where a user of the target user device is located.

In certain embodiments, the attribute information of the product includes order information of the product, and the method further includes providing an order option while presenting the product information; and in response to the order option being selected, placing an order of the product according to the order information.

In certain embodiments, presenting the content sharing scene includes presenting the virtual content scene using at least one of a virtual reality device, an augmented reality device, a holographic projector, or a laser projector.

In another aspect of the present disclosure, a computing device for performing content sharing is provided. The computing device includes: a non-transitory computer-readable storage medium storing a plurality of computer-executable instructions; and a processor, coupled to the non-transitory computer-readable storage medium and configured to execute the computer-executable instructions to: obtain real-time image information of a target content for a content sharing event; obtain user information of a plurality of user devices participating the content sharing event, the plurality of user devices including the computing device, the user information of the plurality of user devices including a plurality of user types of the plurality of user devices and/or interaction information of the plurality of user devices, and the plurality of user types including a first user type and a second user type different from the first user type; present a virtual content sharing scene that includes the image information of the target content and the interaction information; obtain authorized supplemental content corresponding to a target user type of the computing device, the target user type being one of the first user type and the second user type, the first user type corresponding to a first selection rule, the second user type corresponding to a second selection rule different from the first selection rule, and the authorized supplemental content corresponding to the first user type being different from the authorized supplemental content corresponding to the second user type; and present at least part of the authorized supplemental content in the content sharing scene.

In certain embodiments, the processor is further configured to execute the computer-executable instructions to determine the target user type according to at least one of a location verification or a user identity verification.

In certain embodiments, the processor is further configured to execute the computer-executable instructions to present a supplemental content selection interface for the computing device; obtain selected supplemental content from the authorized supplemental content according to a user operation performed on the supplemental content selection interface; and present the selected supplemental content in the content sharing scene.

In certain embodiments, the processor is further configured to execute the computer-executable instructions to send an access request for obtaining additional information about the target content, the access request including the target user type of the computing device; receive a requirement associated with the access request; send an acceptance response indicating that the target user fulfills the requirement; and after sending the acceptance response, receive the additional information about the target content.

In certain embodiments, the authorized supplemental content includes at least one of a map, a blueprint, ranging information, dimension information, location information, a quote, or purchase information.

In certain embodiments, the processor is further configured to execute the computer-executable instructions to obtain product information including at least a graphic representation of a product and attribute information of the product; and present the product information.

BRIEF DESCRIPTION OF THE DRAWINGS

In order to more clearly illustrate the technical solutions in the embodiments of the present disclosure, the drawings used in the description of the embodiments will be briefly described below. It is obvious that the drawings in the following description are only some embodiments of the present disclosure. Other drawings may be obtained by those of ordinary skill in the art based on these drawings.

DETAILED DESCRIPTION

The technical solutions according to the embodiments of the present disclosure are described in the following with reference to the accompanying drawings. The described embodiments are only part of the embodiments of the present disclosure, but not all the embodiments. All other embodiments obtained by a person of ordinary skill in the art based on the embodiments of the present disclosure without creative efforts are within the scope of the present disclosure.

The present disclosure provides a method, a device, and a system for synchronous recording and playback of real scenes and supplemental contents in real time, as well as selectively outputting desired content during recording, playback, and sharing according to targeted audience or system or user configuration. For example, the method, device, and system of the present disclosure may provide the following functions:

1. performing on-site real-time recording of real scenes in a physical environment;
2. superimposing supplemental contents on the videos of real-scene recording, where the supplemental contents may include contents such as interactive information, special effects, feedback from online and off-line users including comments, thumbs-up, digital gifts, and so on, and the contents may be in the forms of text, images, videos, audios, animations, and other AR contents;

3. storing, exporting, and replaying the video contents, where during playback, supplemental contents may be selectively superimposed on the real-scene videos;
4. allowing a user to choose a time or a place for recording and playback, and providing different manners for display according to different scenes;
5. providing language support functions such as real-time voice recognition, voice-to-text transcription, voice translation, and so on; and
6. providing supplementary indications and instructions, such as giving directions, providing route navigation, and so on.

Further, according to certain embodiments of the present disclosure, a display terminal for real scene display and playback may be a smart device such as a smart phone, AR glasses, a tablet computer, or a TV or a screen projector, and so on. The system, device, and method can be applied to a wide variety of application scenarios involving live events, such as concerts, lectures, competitions, symposiums, seminars, face-to-face interviews and so on.

Figure 1:
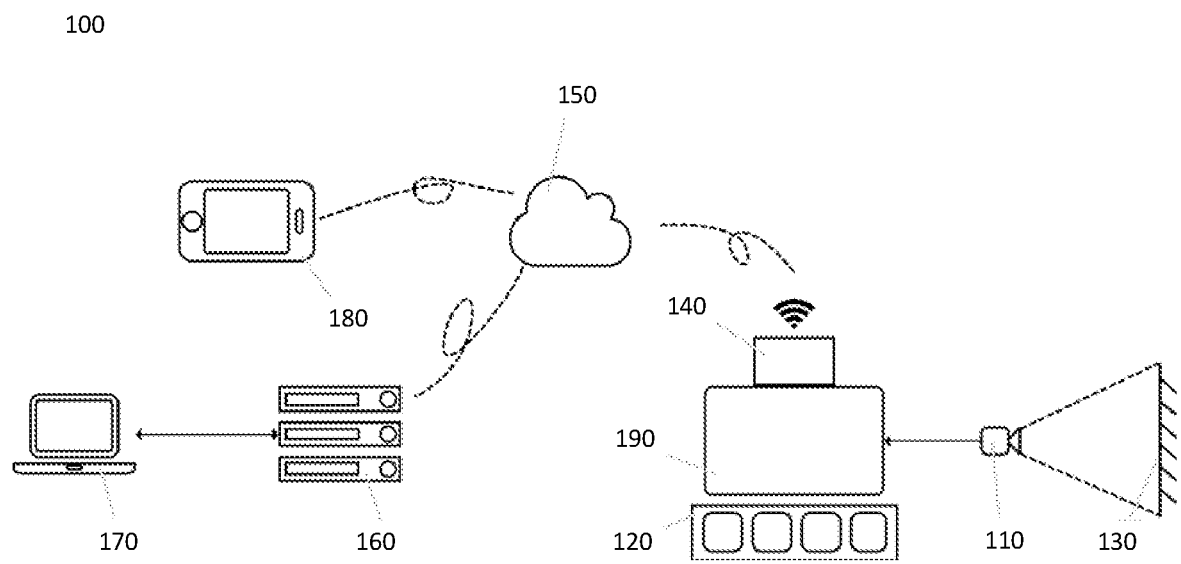
FIG. 1 illustrates an application scenario of the content streaming and recording system according to certain embodiments.

In one aspect of the present disclosure, a content streaming and recording system is provided. FIG. 1 shows an application scenario of the content streaming and recording system 100 according to certain embodiments. As shown in FIG. 1, the content streaming and recording system 100 may include a camera 110, a control interface 120, a wireless communication unit 140, a public network 150, a data server 160, a processing server 170, a user terminal 180, and a display interface 190. The camera 110 may be configured to record videos of a real scene 130 in a physical environment. The real scene 130 may also be termed as a physical scene and it is a scene taking place in the physical environment instead of a computer-generated or a camera-recorded scene. The display interface 190 may be configured to display scenes recorded by the camera 110. The control interface 120 may be configured to receive user inputs. In some embodiments, the control interface 120 may include a physical control panel. In certain other embodiments, the control interface may include a software interface displayed on a screen. The control interface 120 and the display interface 190 may be associated with one or more processors that execute command to operate the control interface 120 and the display interface 190. The control interface 120 and the display interface 190 may communicate with the user terminal through the public network 150. In certain embodiments, the control interface 120 and the display interface 190 may communicate with the data server 160 and the processing server 170 through the public network 150. The data server 160 and the processing server 170 may process the recorded real-scene video and supplemental contents to create a customized AR display. In certain embodiments, the user terminal may employ augmented reality (AR) technology, and display real-time special effects or interactive information in as AR contents.

The control interface 190 may control whether the display interface 190 displays the recorded real-scene videos in real time. It may further control whether to superimpose supplemental contents on the real-scene videos on the display interface 190 in real time. The supplemental contents may include supplemental information of a scene in the real-scene videos (e.g., subtitles). The supplemental contents may also include supplemental information of a target object in the real-scene videos, such as text, images, or animations providing additional information about the target object. Further, the supplemental contents may include notification information from a surrounding environment, such as notification from a theater where the live event takes place. Supplemental information customized to specific audience may also be included, such as multilingual annotations, and feedback from off-site viewers (such as discussions of friends outside the theater about shared videos) may also be included.

The control interface may also control whether to upload and share the recorded live videos and supplemental contents in real time through the wireless communication component 140. The processing server 170 may push supplemental information that matches the current content and the subscribed information that matches a user to the public network 150 through the server 160.

The processing server 170 may receive the recorded real-scene videos as well as the supplemental contents displayed on the on-site display interface with the real-scene videos uploaded and shared by the on-site users in real time from the network 150 through the data server 160. The processing server 170 may further perform secondary processing on the received video data and supplemental contents, and upload the processed contents to the public network 150 through the data server 160.

In certain embodiments, the control interface may control uploading and sharing the recorded live videos and supplemental contents in real time as the contents are being recorded. An off-site viewer may receive real-time contents uploaded and shared by on-site users from on the public network 150 through the user terminal 8, enabling content sharing and discussion. The off-site viewer may also receive real-time contents from the processing server 170 via the public network 150 through the user terminal 8, enabling superimpose display of contents such as commercial promotion while ensuring content privacy and security. In certain other embodiments, the control interface may control storing the recorded live videos and supplemental contents in a memory device, and control uploading and sharing the recorded live videos and supplemental contents after the contents have been recorded.

In certain embodiments, the camera 110, the control interface 120, and the display interface 190 may be included in an electronic device, such as a smart device. A user at the location of a live event may be a member of the on-site audiences. The user may use the smart device to record the event and at the same time use the control interface on the smart device to configure the recording, playback, and sharing the recorded videos. In one example, the user may use the control interface to choose which supplemental contents to superimpose the playback video while recording. In another example, the user may choose which supplemental contents to upload with the recorded real-scene data to a video hosting platform.

In certain embodiments, the camera 110 may be separated from the display interface 190 and the control interface 120. For example, the camera 110 may be a DV camcorder operated by a photographer. Live video recorded by the DV camcorder may be transmitted to the display interface 190 in real time for playback. The control interface 120 may be operated by an event organizer to generate supplemental contents and to specify which supplemental contents can be shared according to a configuration. The configuration may include different audience categories, for example, on-site audience, VIP audience, and off-site audience. The configuration may further include an index of the supplemental contents allowed to be shared with a corresponding group. For example, the event organizer may allow a specific supplemental content to be delivered to the on-site audiences but not allow it to be uploaded to a public video hosting platforms or be shared to outside audiences. Through the control interface 120, the event organizer may further selectively deliver the supplemental contents to a specific audience based on audience information such as audience category, audience location, audience request, and so on. Certain audience information may be acquired through wirelessly communicating with an application installed on a user mobile device. For example, the control interface 120 may communicate with the user mobile device and receive a location of an event attendee from the user mobile device. Once the location of the event attendee is determined, the control interface 120 may select supplemental contents to deliver to the user mobile device, such as AR superimpose on the recorded videos to provide direction and navigation information, location-specific special effects, and so on.

Figure 2:
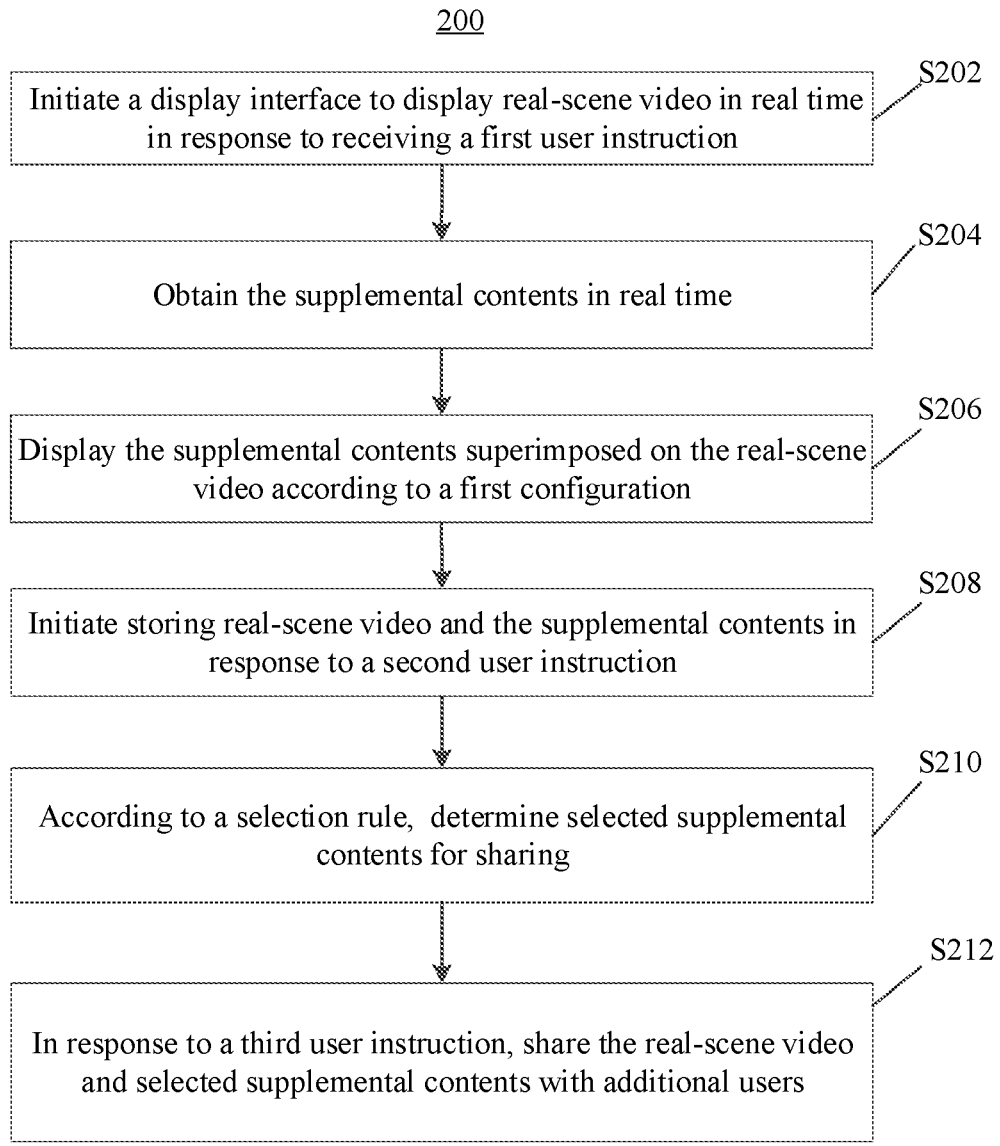
FIG. 2 illustrates a content recording and sharing method according to certain embodiments.

In an aspect of the present disclosure, a content recording and sharing method is provided. FIG. 2 illustrates the content recording and sharing method 200 according to certain embodiments. The method may be implemented by a user terminal device. In certain embodiments, the user terminal device may be a mobile device used by a user who is an on-site participant or an on-site audience of a live event. In certain embodiments, the user terminal may employ augmented reality (AR) technology, and configured to display real-time special effects or interactive information in as AR contents. The user terminal device may have a display interface to display contents, an interactive interface for receiving user instructions, a communication unit to receive and send data via a network, and processor that executes computer program instructions to control operations of the display interface, the input interface, and communication unit. In certain embodiments, the user terminal device may further include a camera configured to record real-scene videos and a memory to store data. As shown in FIG. 2, the content recording and sharing method may include the following steps.

Step S202 is to initiate a display interface to display real-scene video in real time in response to receiving a first user instruction. The real-scene video is a video capturing a physical scene taking place in a physical environment. By contrast, the real-scene video is not a computer-generated display or a video recording of a computer-generated or recorded display. In certain embodiments, the user terminal device may receive a user instruction through the interactive interface to start displaying real-scene videos on the display interface. In one example, an on-site participant or audience may use the camera of the user terminal device to capture real scenes at an event location. The captured real scene may be displayed on the display interface of the user terminal device. In another example, the user terminal device may receive real-scene video data from another camera at the event location, and display the video since on the display interface in real time.

Step S204 is to obtain the supplemental contents in real time. In certain embodiments, the supplemental contents may be received from a server in real time. For example, the event organizer may create supplemental contents synchronized with the real-scene videos to better inform the audience or to enhance their experience. The user terminal device may receive these supplemental contents. The supplemental contents may include supplemental information of a scene in the real-scene videos (e.g., subtitles). The supplemental contents may also include supplemental information of a target object in the real-scene videos, such as text, images, or animations providing additional information about the target object. Further, the supplemental contents may include notification information from a surrounding environment, such as notification from a theater or other types of venue where the live event takes place. For example, a theater where the event is taking place may send the seating information to the audience in real time, and may notify the audience the starting time, the finishing time, and/or the progress of the performance. In other examples, the venue may use the supplemental contents to timely broadcast emergency information to the on-site audience, including, for example, occurrence or forecast of a natural disaster and warnings of such event. Further, in other examples, the supplemental contents may be used to notify off-site information to the audience in real time, such as traffic and weather conditions, or to provide assistance information such as real-time taxi service information. Supplemental information customized to specific audience may also be included, such as multilingual annotations. Feedback from on-site and off-site viewers (such as discussions of friends outside the theater about shared videos) may also be included in the supplemental information. In certain embodiments, the user terminal device may provide a user ID and credential data to the server, so that the server may authorize the user terminal device to receive certain supplemental contents. In certain embodiments, the user terminal device may provide additional information to the server, such as location data, owner data, user subscription and preference, and so on, so that the server may tailor supplemental contents provided to that specific user terminal device. In certain embodiments, the user may configure one or more of the owner data, user subscription data, and user preference data on the user terminal device. In certain embodiments, the sever may determine a user category according to one or more of the user ID, user credential data, location data, owner data, user subscription data, and user preference data, and determine which supplemental contents to be delivered to the specific user terminal device. For example, one or more of the user ID, user credential data, and user location data, and/or owner data may indicate that the user is a ticketed on-site participant, and the server may accordingly authorize the user to receive certain supplemental contents that are not available to a user not being an on-site participant. In another example, one or more of the user ID, user credential data, and user location data, and/or owner data may indicate that the user is a VIP on-site participant, and the server may accordingly authorize the user to receive additional supplemental contents. In another example, the server may use the location data to determine certain supplemental contents containing a visual effect specifically designed for a viewing angle corresponding to the user location, and deliver the supplemental contents containing the special visual effect to the user terminal device, so the special visual effect may be displayed superimposing the real-scene video on the user terminal device. In yet another example, the server may use the location data and one or more of the user ID and/or credential data to determine certain supplemental contents containing navigation information for guiding the user from the current location to a designated seating location of the user, and deliver the supplemental contents containing the navigation information to the user terminal device to help guiding the user to find the designated seating location.

Step S206 is to display the supplemental contents superimposed on the real-scene video in the display interface according to a first configuration. In certain embodiments, the user terminal device may superimpose received supplemental contents to the real-scene video. The user terminal device may selectively display certain supplemental information, and display the selected supplemental information in a certain manner, according to a first configuration. In certain embodiments, the user terminal device may store configuration information, such as selection of a language, or whether to display a certain category of supplemental information. Certain configuration information may be entered by the user through a user interface. Certain other configuration information may be configured at the time when a software application corresponding to the display interface is installed on the user terminal device, or when the display interface is initiated. The configuration information may include the first configuration. In certain embodiments, the user may change the first configuration according to user need or preference.

Step S208 is to initiate storing real-scene video and the supplemental contents in response to a second user instruction. In certain embodiments, the user may choose to store the real-scene video as well as the supplemental contents for later playback or sharing. In certain embodiments, the real-scene video and the supplemental contents may be stored in a same file with time information, so that they can be synchronized at playback. In certain other embodiments, the real-scene video and the supplemental contents may be stored in separate files, each having time information or synchronization information. In certain embodiments, the real-scene video and the supplemental contents may be stored according to a second user configuration in addition to the user instruction. The second user configuration may also be stored on the user terminal device and may be changed by the user. For example, the second user configuration may be used to specify video storage format, resolution, compression, as well as types of supplemental information to be stored. In certain embodiments, the second user configuration may be configured or edited by the event organizer, and the user terminal device may receive the configuration information from the server in real time. For example, the event organizer may allow a specific supplemental content to be delivered to the on-site audiences for viewing but not allow it to be stored to the user terminal device.

Step S210 is to determine selected supplemental contents for sharing according to a selection rule. The method in the present disclosure provides flexibility of sharing only selected supplemental contents to a specific group of audiences. For example, off-site viewers may not access certain supplemental contents due to the event organizer's preference or data security and privacy. In certain embodiments, an on-site user may choose to share the event video with outside viewers, and a subset of the supplemental contents the on-site user receives may be selected to share with the outside viewers along with the real-scene videos. The selection may be made according to a selection rule. In certain embodiments, the selection rule may be pre-configured, for example, as pre-configured parameters of a software application running on the user terminal device. In certain embodiments, the selection rule may also be made or edited in real time by the event organizer, and the user terminal device may receive the selection rule from the server in real time. For example, the event organizer may allow a specific supplemental content to be delivered to the on-site audiences but not allow it to be uploaded to a public video hosting platforms or be shared to outside viewers. In certain other embodiments, the on-site user may edit certain aspect of the selection rule using the interactive interface of the user terminal device. For example, the on-site user may choose to share or not to share a specific supplemental content with a specific group of off-site viewers.

S212 is to share the real-scene video and selected supplemental contents with additional users according to a third configuration in response to a third user instruction. In certain embodiments, the sharing may be achieved by uploading the real-scene video and selected supplemental contents to a video hosting platform. The real-scene video and selected supplemental contents may be uploaded from the on-site user terminal device to a video hosting platform or a data server in order for other viewers to access them. The process may be conducted according to a third user configuration. In certain embodiments, the selected supplemental contents and the real-scene videos may be processed by the user terminal device to generate superimposed video contents for the sharing. In certain other embodiments, the selected supplemental contents and the real-scene videos may be first sent with their time or synchronization information to a processing server to generate the superimposed video contents.

In certain embodiments, the real-scene video and selected supplemental contents may be uploaded in real time as the contents are being recorded. Thus, an off-site viewer may receive real-time contents uploaded and shared by on-site users from a public network, enabling real time content sharing and discussion. In certain other embodiments, the real-scene video and selected supplemental contents may be uploaded at a later time after the contents have been recorded. Additional post processing and editing may be performed on the stored contents before sharing.

Figure 3:
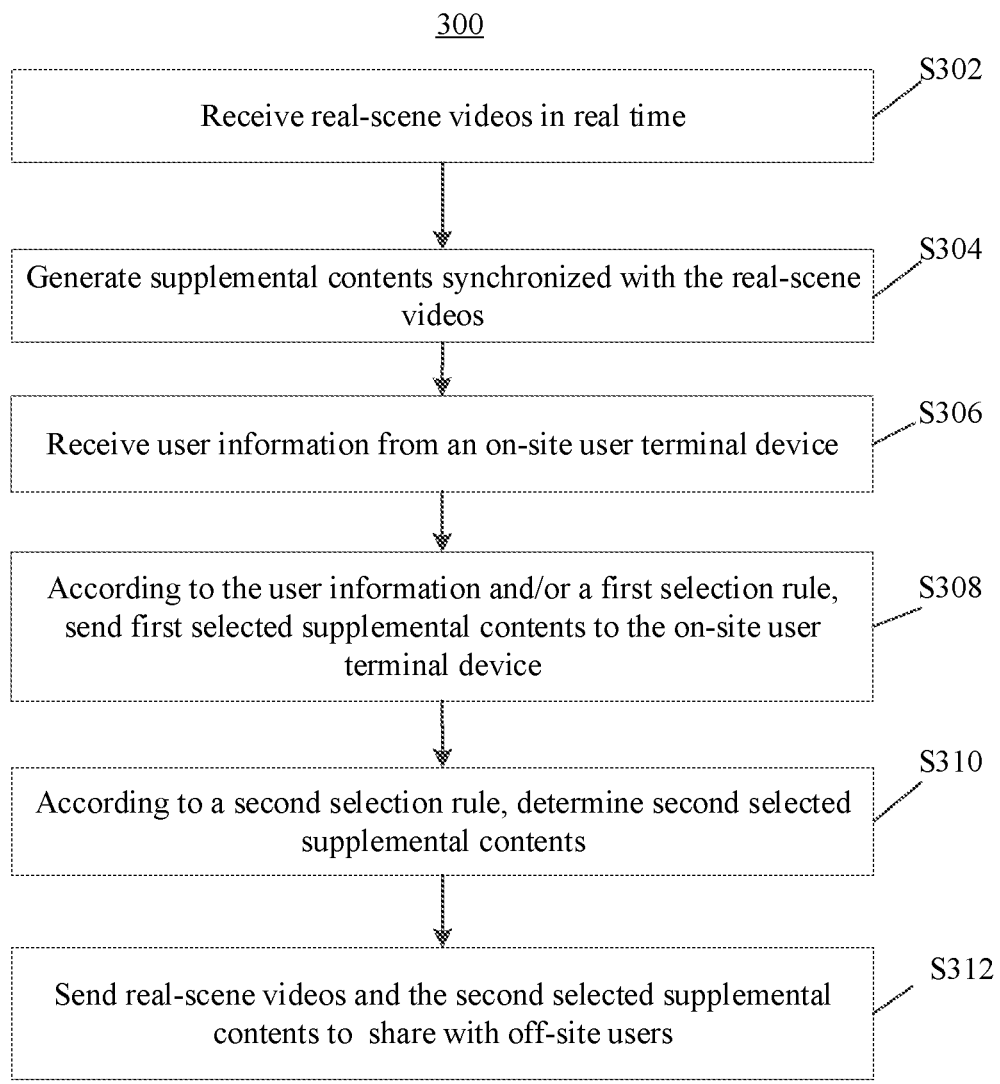
FIG. 3 illustrates a content recording and sharing method according to certain other embodiments.

FIG. 3 illustrates another content recording and sharing method according to certain other embodiments. The method may be implemented by a computing device. In certain embodiments, the computing device may be a server used by an event personnel to provide content and media management for the event. The server may have a display interface to display contents, an interactive interface for receiving user instructions, a communication unit to receive and send data via a network, and processor that executes computer program instructions to control operations of the display interface, the input interface, and communication unit. In certain embodiments, the computing device may communicate with a camera configured to record real-scene videos and a memory to store data. As shown in FIG. 3, the content recording and sharing method 300 may include the following steps.

Step S302 is to receive real-scene videos in real time. In certain embodiments, the computing device may receive video data from a camera, for example, from a DV camcorder that records real-scene videos at an event location. In certain embodiments, the computing device may further control the camera to take real-scene videos while receiving video data from the camera.

Step S304 is to generate supplemental contents synchronized with the real-scene videos. In certain embodiments, the event organizer or personnel may create supplemental contents synchronized with the real-scene videos to better inform the audience or to enhance audience experience. The supplemental contents may include supplemental information of a scene in the real-scene videos (e.g., subtitles). The supplemental contents may also include supplemental information of the physical scene or a target object in the real-scene videos, such as text, audio signal, images, or animations providing additional information about the physical scene or the target object. Further, the supplemental contents may include notification information from a surrounding environment, such as notification from a theater or other types of venue where the live event takes place.

Step S306 is to receive user information from an on-site user terminal device. The method provided by the present disclosure may offer the event organizer the flexibility to deliver supplemental contents customized to specific audience. Thus, in certain embodiments, the computing device may receive user information from a user terminal device. In certain embodiments, the user terminal device may provide user ID and credential data to the computing device, so that the computing device may authorize the user terminal device to receive certain supplemental contents. In certain embodiments, the user terminal device may provide additional information to the computing device, such as location data, owner data, user subscription and preference, and so on, so that the computing device may tailor supplemental contents provided to that specific user terminal device.

Step S308 is to send first selected supplemental contents to the on-site user terminal device according to the user information and/or a first selection rule. In certain embodiments, the computing device may select supplemental contents according to the user information and/or a first selection rule, and send selected supplemental contents to the on-site user terminal, so that an on-site user may view the targeted supplemental contents superimposed on the real-scene video. In certain embodiments, the computing device may determine a user category according to one or more of the user ID, user credential data, location data, owner data, user subscription data, and user reference data, and determine which supplemental contents to be delivered to the specific user terminal device according to the user category. For example, the computing device may determine whether the user terminal device is associated with a user who is a ticketed on-site participant based on one or more of the user ID, user credential data, user location data, and/or owner data, and the computing device may accordingly authorize the user to receive certain supplemental contents that are not available to a user not being an on-site participant. In another example, the computing device may determine whether the user is a VIP participant based on one or more of the user ID, user credential data, and user location data, and/or owner data, and the computing device may accordingly authorize the user to receive additional supplemental contents targeted to VIP participants. In another example, the computing device may use the location data to determine certain supplemental contents containing a visual effect specifically designed for a viewing angle corresponding to the user location, and deliver the supplemental contents containing the special visual effect to the user terminal device, so the special visual effect may be displayed superimposing the real-scene video on the user terminal device. In yet another example, the computing device may use the location data and one or more of the user ID and/or credential data to determine certain supplemental contents containing navigation information for guiding the user from the current location to a designated seating location of the user, and deliver the supplemental contents containing the navigation information to the user terminal device to help guiding the user to find the designated seating location.

Step S310 is to determine second selected supplemental contents according to a second selection rule. The method in the present disclosure provides flexibility of sharing only selected supplemental contents to a specific group of audiences. For example, the event organizer may allow a specific supplemental content to be delivered to the on-site audiences but not allow it to be uploaded to a public video hosting platforms or be shared to outside audiences. For example, off-site audiences may not access certain supplemental contents due to the event organizer's preference or data security and privacy. In certain embodiments, the computing device may configure a selection rule to specify which supplemental contents are to be shared with off-site viewers.

Step S312 is to share real-scene videos and the second selected supplemental contents with off-site viewers. In certain embodiments, the computing device may share the real-scene videos and the second selected supplemental contents with off-site viewers who are not direct participants of the event. In certain embodiments, the computing device may locally process the real-scene videos and the second selected supplemental contents to generate a superimposed video, and upload the superimposed video to a video hosting platform to share with off-site viewers. In certain other embodiments, to save computational resources, the computing device may send the real-scene videos and the second selected supplemental contents to a processing server to cause the processing server to superimpose the real-scene videos with the second selected supplemental contents to share with off-site viewers.

In certain embodiments, the real-scene video and selected supplemental contents may be sent to a processing server in real time as the contents are being recorded. Thus, an off-site viewer may receive real-time contents shared by the processing server from a public network, enabling real time content sharing and discussion. In certain other embodiments, the real-scene video and selected supplemental contents may be sent to the processing server at a later time after the contents have been recorded. Additional post processing and editing may be performed on the stored contents before sharing.

Figure 4:
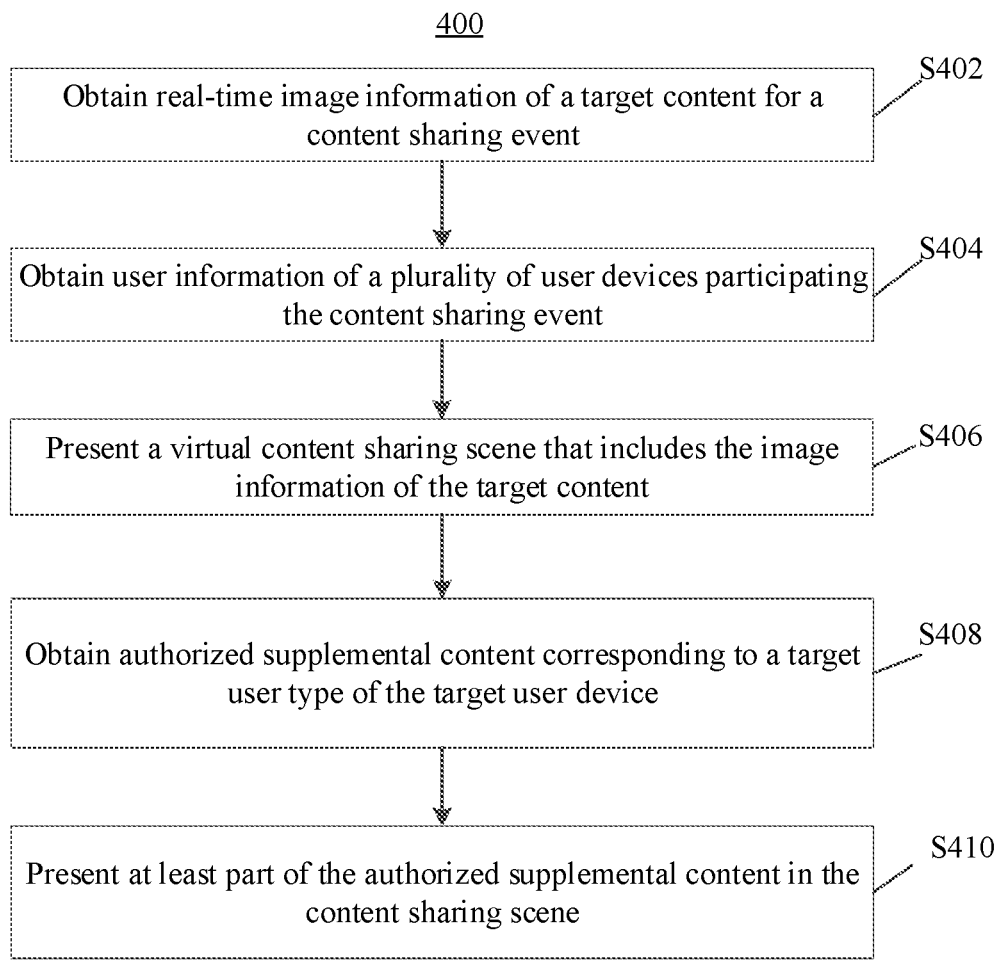
FIG. 4 illustrates a content sharing method according to certain other embodiments.

FIG. 4 illustrates another content sharing method according to certain other embodiments. The method may be implemented by a computing device. In certain embodiments, the computing device may be a server used by an event personnel to provide content and media management for the event. The server may have a display interface to display contents, an interactive interface for receiving user instructions, a communication unit to receive and send data via a network, and processor that executes computer program instructions to control operations of the display interface, the input interface, and communication unit. In certain embodiments, the computing device may communicate with a camera configured to record real-scene videos and a memory to store data. As shown in FIG. 4, the content sharing method 400 may include the following steps.

Step S402 is to obtain real-time image information of a target content for a content sharing event. In certain embodiments, the computing device may obtain real-time image information of the target content from a camera. In certain embodiments, the computing device may obtain two-dimensional (2D) or three-dimensional (3D) image data that may depict a physical scene where the target content is located in real time. In some embodiments, the computing device may obtain 2D or 3D image data of a virtual scene of the target content in real time.

The target content may describe an object or a scene of interest for the content sharing event, such as a product, a PowerPoint presentation, a construction site, a building, a concert, a bidding event, etc. The object or the scene of interest may be virtual or physical. The target content can have any proper format, such as text, audio, two-dimensional image, video, three-dimensional image/model, hologram, or a combination thereof. The image information of the target content may refer to a visible presentation of the target content.

The content sharing event provides an online venue for user devices at different locations to view and interact with each other about the target content in real-time. Real-time, as used herein, refers to substantially the same time and allows reasonable latency due to network speed and computing capacity of local device, such as a latency within a couple of seconds or minutes.

Step S404 is to obtain user information of a plurality of user devices participating in the content sharing event. The user information of the plurality of user devices includes a plurality of user types of the plurality of user devices and/or interaction information of the plurality of user devices. The plurality of user types include, for example, a first user type and a second user type different from the first user type. The computing device performing the method 400 can be one of the plurality of user devices, and is also referred to as a "target user device." The user type of the target user device is also referred to as a "target user type."

The interaction information may include, for example, text, audio, video, and/or a status indicator indicating that the user is online/offline. The interaction information can be used for the users participating in the content sharing event to obtain information of the other users participating in the content sharing event, for example, who are attending the content sharing event at the same time, or what are the other users sharing in the content sharing event for all the participants. In some embodiments, the interaction information may further be used for the participants to interact with each other in real-time through, for example, audio or video chatting. In some embodiments, the interaction information of a user may include information about holographic projection of the user or another object/scene, which may be presented in the content sharing scene.

In certain embodiments, the computing device may determine the user type of a user device, such as the target user type of the computing device, according to at least one of location verification or user identity verification. In some embodiments, the user identity verification includes user biometric information verification.

In some embodiments, the user type (i.e., the target user type) of the computing device may be determined based on the role of the user using the computing device via the user identity verification. For example, if the user is a client, the user type determined based on the user identity verification is a client type. As another example, if the user is a vendor, the user type determined based on the user identity verification is a vendor type. The user identity verification may be performed based on the user identity information. The user identity information may include user identification number (ID), user name, or user biometric information, etc. The user biometric information may include face information of the user or fingerprint information of the user. The user identity verification may include face detection or fingerprint detection.

In some embodiments, the user type of the computing device may be determined based on the location of the user using the computing device via the location verification. For example, if the user is in city A, the user type determined based on the location verification is a city A user type, while if the user is in city B, the user type determined based on the location verification is a city B user type. The location of the user may be determined based on the physical location where the user is using the computing device. The location of the user may be determined based on the internet protocol (IP) address of the computing device.

An organizer and/or an administrator of the content sharing event may determine user types and corresponding supplemental content selection rules for the event. Different events may have different sets of user types. For example, in one event, the user types may include vendor type and client type; in another event, the user types may include live user type and remote user type; and in another event, the user types may include customer type and seller type.

Step S406 is to present a virtual content sharing scene. The virtual content sharing scene can include the image information of the target content. In some embodiments, the virtual content sharing scene can further include the interaction information.

In some embodiments, the content sharing scene may be presented using at least one of a virtual reality device, an augmented reality device, a holographic projector, or a laser projector. In some embodiments, the content sharing scene may be presented on a screen.

Step S408 is to obtain authorized supplemental content corresponding to the target user type of the target user device (the computing device). Different user types may correspond to different selection rules. The target user type may be one of the first user type and the second user type. The first user type may correspond to a first selection rule. The second user type may correspond to a second selection rule different from the first selection rule. The authorized supplemental content corresponding to the first user type may be different from the authorized supplemental content corresponding to the second user type.

In some embodiments, the authorized supplemental content(s) may include at least one of a map, a blueprint, ranging information, dimension information, location information, a quote, or purchase information.

In some embodiments, the user using the computing device may have authority to view various supplemental contents. Such supplemental contents are also referred to as "authorized supplemental contents." The user using the computing device may designate one or more of the authorized supplemental contents as the default supplemental content(s) to be displayed in the content sharing scene. For example, the user is a client, and the user has authority to view a blueprint, ranging information, dimension information, a quote, and purchase information of a product. The user may select one or more of the blueprint, the ranging information, the dimension information, the quote, and the purchase information of the product as the default supplemental content(s) to be displayed in the content sharing scene via a selection operation on the computing device.

In certain embodiments, the computing device may include a display for presenting a supplemental content selection interface for the user using the computing device. The computing device may display the authorized supplemental contents in the supplemental content selection interface and may obtain the default supplemental content according to a user operation performed on the supplemental content selection interface. The computing device may obtain selected supplemental content from the authorized supplement content according to the user operation as the default supplemental content to be displayed in the content sharing scene.

Step S410 is to present at least part of the authorized supplemental content in the content sharing scene.

In certain embodiments, the computing device may also allow the user to select the displayed default supplemental content from the authorized supplemental content. For example, the computing device may display the authorized supplemental contents in the supplemental content selection interface. The computing device may obtain selected supplemental content according to a user operation performed on the supplemental content selection interface. The computing device may further present the selected supplemental content, i.e., displaying the selected supplemental content in the content sharing scene.

For example, the user using the computing device has authority to view content A, content B, content C, and content D. The default supplemental contents presented in the content sharing scene include content A and content B. The user may perform a selection operation on the supplemental content selection interface displayed on the computing device to select content C and content D to be presented in the content sharing scene. After the user performs the selection operation, the default supplemental contents (content A and content B) presented in the content sharing scene are replaced by the selected supplemental contents (content C and content D). In another example, the default supplemental contents presented in the content sharing scene include content A, content B, content C. The user may perform a selection operation on the supplemental content selection interface displayed on the computing device to select content B, content C, and content D to be presented in the content sharing scene. After the user performs the selection operation, the default supplemental contents (content A, content B, and content C) presented in the content sharing scene are replaced by the selected supplemental contents (content B, content C, and content D). In some embodiments, the user may perform a selection operation on the supplemental content selection interface displayed on the computing device to select all the authorized supplemental contents to be presented in the content sharing scene. After the user performs the selection operation, all the authorized supplemental contents (content A, content B, content C, and content D) are presented in the content sharing scene, where the default supplemental contents are the same as the authorized supplemental contents.

In certain embodiments, the computing device may send an access request for obtaining additional information about the target content, receive a requirement associated with the access request, send an acceptance response indicating that the target user fulfills the requirement, and after the acceptance response is sent, receive the additional information about the target content. The access request may include the target user type of the computing device.

For example, the user using the computing device is a vendor, and the user has authority to view the blueprint, the ranging information, and the dimension information of a product as the authorized supplemental contents. If the user requests to view the purchase information of the product, which is not an authorized supplemental content, the computing device may send an access request to the server for obtaining the purchase information of the product, where the access request includes information indicating that the user type of the computing device is vendor type. The server then sends to the computing device a requirement associated with the access request, such as signing an additional agreement. After the computing device receives the requirement, if the user fulfills the requirement, e.g., if the user signs the additional agreement, the computing device sends an acceptance response indicating that the user fulfills the requirement to the server. After receiving the acceptance response, the server may send the purchase information of the product to the computing device. If the user does not fulfill the requirement, the server may deny the access request sent by the user using the computing device.

In certain embodiments, the target user type of the computing device (the target user device) is the first user type, the computing device may receive an access request for obtaining additional information about the target content from one of the plurality of user devices and the one of the plurality of user devices has the second user type, send a requirement associated with the access request, receive an acceptance response indicating that the one of the plurality of user devices with the second user type fulfills the requirement, and send the additional information about the target content to the one of the plurality of user devices with the second user type.

For example, the user using the computing device is a client. Another user using one of the plurality of user devices is a vendor. The vendor has authority to view the blueprint, the ranging information, and the dimension information of a product as the authorized supplemental contents. If the vendor requests to view the purchase information of the product, which is not an authorized supplemental content for the vendor, the vendor using the one of the plurality of user devices may send an access request to the computing device for obtaining the purchase information of the product, where the access request includes information indicating that the user type of the user device of the vendor is vendor type. The computing device receives the access request and sends to the user device of the vendor a requirement associated with the access request, such as signing an additional agreement. The user device of the vendor may then send a response to the computing device. In response to the computing device determining that the vendor fulfills the requirement, the computing device used by the client may authorize the user device used by the vendor to obtain the purchase information of the product. In response to the computing device determining that the vendor does not fulfill the requirement, the computing device used by the client may deny the access request for obtaining the purchase information of the product from the vendor. After the client authorizes the vendor to obtain the purchase information of the product, the user device of the vendor may obtain the purchase information from the computing device or the server.

In certain embodiments, the first user type is a client type and the second user type is a vendor type, the target user type of the computing device is the client type. The computing device may present a vendor supplemental content selection interface, obtain a vendor-specific selection rule corresponding to the vendor type according to a user operation on the vendor supplemental content selection interface, and send the vendor-specific selection rule to one of the plurality of user devices that has the vendor type for the one of the plurality of user devices with the vendor type to obtain and present selected supplemental contents in the content sharing scene according to the vendor-specific selection rule.

The method in the present disclosure provides flexibility of sharing only selected supplemental contents to one or more user devices with a specific user type. For example, off-site viewers may not access certain supplemental contents due to the event organizer's preference or data security and privacy. In certain embodiments, an on-site user may choose to share the event video with outside viewers, and a subset of the supplemental contents that the on-site user receives may be selected to share with the outside viewers along with the real-scene videos. The selection may be made according to a selection rule. In certain embodiments, the selection rule may be pre-configured, for example, as pre-configured parameters of a software application running on the user terminal device. In certain embodiments, the selection rule may also be made or edited in real time by the event organizer, and the user terminal device may receive the selection rule from the server in real time. For example, the event organizer may allow a specific supplemental content to be delivered to the on-site audiences but not allow it to be uploaded to a public video hosting platforms or be shared with outside viewers. In certain other embodiments, the on-site user may edit certain aspect of the selection rule using the interactive interface of the user terminal device. For example, the on-site user may choose to share or not to share a specific supplemental content with a specific group of off-site viewers In certain embodiments, the first user type is a client type and the second user type is a vendor type, the target user type of the computing device is the vendor type. The computing device may receive a vendor-specific selection rule from one of the plurality of user devices with the client type, obtain selected supplemental content according to the vendor-specific selection rule, and present the selected supplemental content in the content sharing scene.

In certain embodiments, the computing device may obtain product information including at least a graphic representation of a product and attribute information of the product, and present the product information.

In some embodiments, presenting the product information may include presenting the product information in the content sharing scene. The product information may include one or more product description text, an image of the product, a laser projection of the product, and an audio including an introduction of the product. The product information may be presented in the content sharing scene via any proper method, for example, playing the audio including the introduction of the product, displaying the product description text with the image of the product, or displaying the product in the content sharing scene via a Holographic projection.

In some embodiments, the computing device may present, using an augmented reality device, the product information according to a physical scene where the user using the computing device is located.

In some embodiments, the attribute information of the product includes order information of the product. The computing device may provide an order option while presenting the product information, and in response to the order option being selected, place an order of the product according to the order information.

For example, the computing device provides an order link or order button with the product information in the content sharing scene. The user may perform an operation on the order link or order button, e.g., clicking the order link of order button, to place an order of the product.

Figure 5:
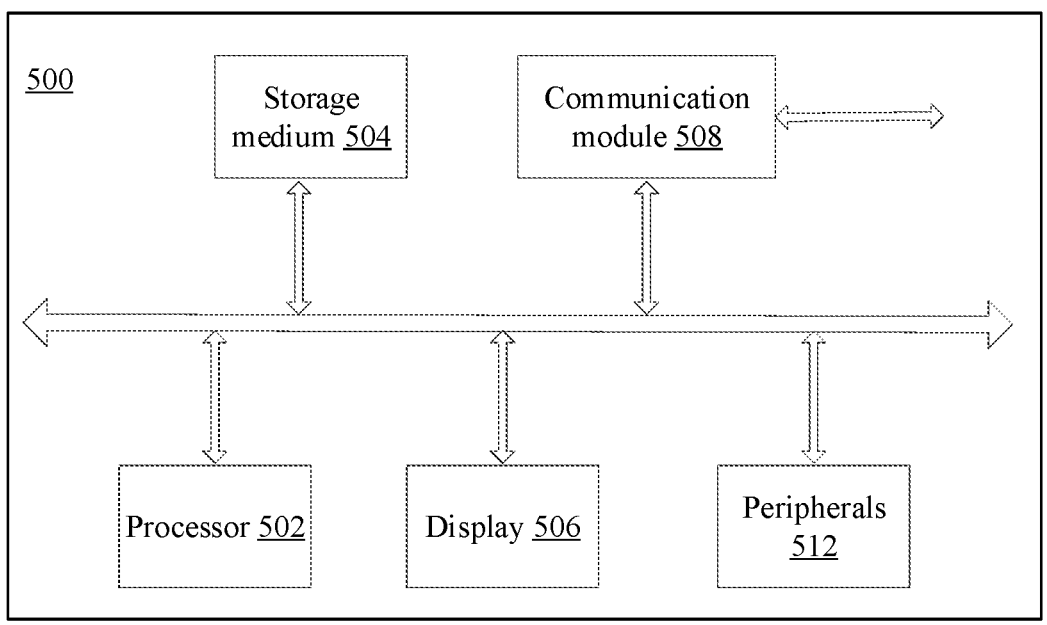
FIG. 5 illustrates a device configuration according to certain embodiments of the present disclosure.

FIG. 5 illustrates a device configuration for the user terminal device for implementing the method of FIG. 2, or the computing device for implementing the method of FIG. 3, or the computing device for implementing the method of FIG. 4 according to certain embodiments. As shown in FIG. 5, the device 500 may be a computing device including a processor 502 and a storage medium 504. According to certain embodiments, the device 500 may further include a display 506, a communication module 408, and additional peripheral devices 512. Certain devices may be omitted, and other devices may be included.

Processor 502 may include any appropriate processor(s). In certain embodiments, processor 502 may include multiple cores for multi-thread or parallel processing. Processor 502 may execute sequences of computer program instructions to perform various processes, such as a neural network processing program. Storage medium 504 may be a non-transitory computer-readable storage medium, and may include memory modules, such as ROM, RAM, flash memory modules, and erasable and rewritable memory, and mass storages, such as CD-ROM, U-disk, and hard disk, etc. Storage medium 504 may store computer programs for implementing various processes, when executed by processor 502. The communication module 408 may include network devices for establishing connections through a network. Display 506 may include any appropriate type of computer display device or electronic device display (e.g., CRT or LCD based devices, touch screens). The Display 506 may include any appropriate type of display for a virtual reality (VR) device, an augmented reality (AR) device, a holographic projector, or a laser projector. Peripherals 512 may include additional I/O devices, such as a keyboard, a mouse, and so on. The peripherals 512 may be couple with a virtual reality (VR) device, an augmented reality (AR) device, a holographic projector, or a laser projector. The processor 502 may be configured to execute instructions stored on the storage medium 504 and perform various operations related to the content recording and sharing method as detailed in FIG. 2, FIG. 3, or FIG. 4.

The method and devices provided by the present disclosure may improve interaction efficiency of on-site users. For example, an on-site user may record the live event or performances while watching the event or performances and interacting with off-site users. The method provided by the present disclosure enables the user to obtain supplemental contents according to customization of the user, thus improving user experience. Further, the method and devices provided by the present disclosure may offer improved commercial integration by presenting advertisement or notification in a more targeted and efficient manner.

The method and apparatus provided by the present disclosure according to the embodiments are described in detail above. The principles and implementation manners provided by the present disclosure are described herein by using specific examples. The description of the above embodiments is only used to help understand the method provided by the present disclosure. At the same time, a person skilled in the art will make changes the specific embodiments and the application scope according to the idea provided by the present disclosure. In summary, the contents of the present specification should not be construed as limiting the present disclosure.

What is claimed is:

1. A content sharing method, implemented by a target user device, comprising:
  obtaining real-time image information of a target content for a content sharing event;
  obtaining user information of a plurality of user devices participating the content sharing event, the plurality of user devices including the target user device, the user information of the plurality of user devices including a plurality of user types of the plurality of user devices, and the plurality of user types including a first user type and a second user type different from the first user type;
  presenting a virtual content sharing scene that includes the image information of the target content, the target content being accessible by all the plurality of user devices;
  obtaining authorized supplemental content corresponding to a target user type of the target user device, the authorized supplemental content being content that supplements and provides additional information to the target content, the target user type being one of the first user type and the second user type, the first user type corresponding to a first selection rule, the second user type corresponding to a second selection rule different from the first selection rule, and the authorized supplemental content corresponding to the first user type being different from the authorized supplemental content corresponding to the second user type;

presenting at least part of the authorized supplemental content in the content sharing scene;

after obtaining the authorized supplemental content corresponding to the target user type, sending an access request for obtaining additional information about the target content, the access request including the target user type of the target user device;

receiving a requirement associated with the access request;

sending an acceptance response indicating that the target user fulfills the requirement; and after sending the acceptance response, receiving the additional information about the target content.

2. The method according to claim 1, further comprising: determining the target user type according to at least one of location verification or user identity verification.

3. The method according to claim 2, wherein the user identity verification includes user biometric information verification.

4. The method according to claim 1, further comprising:
presenting a supplemental content selection interface for the target user device;
obtaining selected supplemental content from the authorized supplemental content according to a user operation performed on the supplemental content selection interface; and
presenting the selected supplemental content in the content sharing scene.

5. The method according to claim 1,
wherein the target user type is the first user type;
the method further comprising:
receiving an access request for obtaining additional information about the target content from one user device of the plurality of user devices, the one user device having the second user type;
sending a requirement associated with the access request;
receiving an acceptance response indicating that the one user device fulfills the requirement; and
sending the additional information about the target content to the one user device.

6. The method according to claim 1, wherein the first user type is a client type and the second user type is a vendor type, the target user type of the target user device is the client type, and the method further comprises:
presenting a vendor supplemental content selection interface;
obtaining a vendor-specific selection rule corresponding to the vendor type according to a user operation on the vendor supplemental content selection interface; and
sending the vendor-specific selection rule to one of the plurality of user devices with the vendor type, for the one of the plurality of user devices with the vendor type to obtain and present selected supplemental content in the content sharing scene according to the vendor-specific selection rule.

7. The method according to claim 1, wherein the first user type is a client type and the second user type is a vendor type, the target user type of the target user device is the vendor type, and the method further comprises:
receiving a vendor-specific selection rule from one of the plurality of user devices with the client type;
obtaining selected supplemental content according to the vendor-specific selection rule; and
presenting the selected supplemental content in the content sharing scene.

8. The method according to claim 1, wherein the authorized supplemental content includes at least one of a map, a blueprint, ranging information, dimension information, location information, a quote, or purchase information.

9. The method according to claim 1, further comprising:
obtaining product information including at least a graphic representation of a product and attribute information of the product; and
presenting the product information.

10. The method according to claim 9, wherein presenting the product information includes presenting the product information in the content sharing scene.

11. The method according to claim 9, wherein presenting the product information includes:
presenting, using an augmented reality device, the product information according to a physical scene where a user using the target user device is located.

12. The method according to claim 9, wherein the attribute information of the product includes order information of the product, and the method further comprises:
providing an order option while presenting the product information; and
in response to the order option being selected, placing an order of the product according to the order information.

13. The method according to claim 1, wherein presenting the content sharing scene includes presenting the virtual content scene using at least one of a virtual reality device, an augmented reality device, a holographic projector, or a laser projector.

14. The method according to claim 1, wherein:
the requirement associated with the access request is signing an additional agreement.

15. A computing device comprising:
a non-transitory computer-readable storage medium storing a plurality of computer-executable instructions; and
at least one processor, coupled to the non-transitory computer-readable storage medium and configured to execute the computer-executable instructions to:
obtain real-time image information of a target content for a content sharing event;
obtain user information of a plurality of user devices participating the content sharing event, the plurality of user devices including the computing device, the user information of the plurality of user devices including a plurality of user types of the plurality of user devices, and the plurality of user types including a first user type and a second user type different from the first user type;
present a virtual content sharing scene that includes the image information of the target content, the target content being accessible by all the plurality of user devices;
obtain authorized supplemental content corresponding to a target user type of the computing device, the authorized supplemental content being content that supplements and provides additional information to the target content, the target user type being one of the first user type and the second user type, the first user type corresponding to a first selection rule, the second user type corresponding to a second selection rule different from the first selection rule, and the authorized supplemental content corresponding to the first user type being different from the authorized supplemental content corresponding to the second user type;
present at least part of the authorized supplemental content in the content sharing scene;

after the authorized supplemental content corresponding to the target user type is obtained, send an access request for obtaining additional information about the target content, the access request including the target user type of the target user device;

receive a requirement associated with the access request;

send an acceptance response indicating that the target user fulfills the requirement; and after the acceptance response is sent, receive the additional information about the target content.

16. The device according to claim 15, wherein the at least one processor is further configured to execute the computer-executable instructions to:

determine the target user type according to at least one of a location verification or a user identity verification.

17. The device according to claim 15, wherein the at least one processor is further configured to execute the computer-executable instructions to:

present a supplemental content selection interface for the computing device;

obtain selected supplemental content from the authorized supplemental content according to a user operation performed on the supplemental content selection interface; and present the selected supplemental content in the content sharing scene.

18. The device according to claim 15, wherein the authorized supplemental content includes at least one of a map, a blueprint, ranging information, dimension information, location information, a quote, or purchase information.

* * * * *